(12) United States Patent
Dykstra Erickson et al.

(10) Patent No.: US 10,970,332 B2
(45) Date of Patent: Apr. 6, 2021

(54) ELECTRONIC DEVICE AND DIGITAL CONTENT MANAGING METHOD

(71) Applicant: Chiun Mai Communication Systems, Inc., New Taipei (TW)

(72) Inventors: Elizabeth Ann Dykstra Erickson, San Francisco, CA (US); Yi-Jen Huang, New Taipei (TW); Chih-Yu Chueh, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/533,906

(22) Filed: Aug. 7, 2019

(65) Prior Publication Data

US 2020/0057779 A1 Feb. 20, 2020

(30) Foreign Application Priority Data

Aug. 15, 2018 (CN) .......................... 201810928623.3

(51) Int. Cl.
   *G06F 16/638* (2019.01)
   *G06F 16/683* (2019.01)
   *G06F 16/64* (2019.01)
   *G06F 16/635* (2019.01)

(52) U.S. Cl.
   CPC .......... *G06F 16/639* (2019.01); *G06F 16/635* (2019.01); *G06F 16/64* (2019.01); *G06F 16/683* (2019.01)

(58) Field of Classification Search
   CPC ...... G06F 16/639; G06F 16/64; G06F 16/683; G06F 16/635
   See application file for complete search history.

(56) References Cited

U.S. PATENT DOCUMENTS

| | | | |
|---|---|---|---|
| 2008/0046397 A1* | 2/2008 | Shirai | G06F 16/639 |
| 2012/0023431 A1* | 1/2012 | Roth | H04M 1/72563 |
| | | | 715/772 |
| 2014/0333422 A1* | 11/2014 | Phang | G06F 3/04815 |
| | | | 340/12.54 |
| 2015/0095323 A1* | 4/2015 | Bates | G06F 16/285 |
| | | | 707/723 |
| 2018/0007148 A1* | 1/2018 | Nielsen | H04L 65/4023 |
| 2018/0088896 A1* | 3/2018 | Olson | G06F 3/165 |
| 2018/0136799 A1* | 5/2018 | Zhang | G06F 3/0482 |
| 2018/0192082 A1* | 7/2018 | O'Driscoll | H04N 21/4788 |

(Continued)

FOREIGN PATENT DOCUMENTS

CN            101150775 A     3/2008

*Primary Examiner* — David E Choi (74) *Attorney, Agent, or Firm* — ScienBiziP, P.C.

(57) ABSTRACT

A method of managing digital content includes displaying a user interface on a display screen of the electronic device. A search instruction is generated according to a search condition. Each of a plurality of cloud servers is controlled to search for digital content meeting the search condition. Related information of the digital content meeting the search condition is received from each of the plurality of cloud servers. A user interface object is generated according to the related information received from each of the plurality of cloud servers, such that a plurality of user interface objects are obtained. Once an object list is generated by aggregating the plurality of the user interface objects, the object list is displayed on a display screen.

12 Claims, 4 Drawing Sheets

(56) References Cited

U.S. PATENT DOCUMENTS

2018/0210952 A1\* 7/2018 Takano ................. G06F 16/683
2018/0349467 A1\* 12/2018 Malhotra ............ G06F 16/2228
2020/0057589 A1\* 2/2020 Jo .......................... G06F 3/041
2020/0057779 A1\* 2/2020 Dykstra Erickson .......................
                                                    G06F 16/639

\* cited by examiner

ELECTRONIC DEVICE AND DIGITAL CONTENT MANAGING METHOD

CROSS-REFERENCE TO RELATED APPLICATIONS

This application claims priority to CN Application No. 201810928623.3 filed on Aug. 15, 2018, the contents of which are incorporated by reference herein.

FIELD

The subject matter herein generally relates to managing technology, and particularly to an electronic device and a method for managing digital content.

BACKGROUND

When a user wants to listen to a piece of music, the user needs to download a music player, then open the music player and search for the piece of music. However, the music player may not provide all the music the user desired to listen. When the user cannot find the desired music on one music player, the users then needs to download another music player, which is time consuming and laborious.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
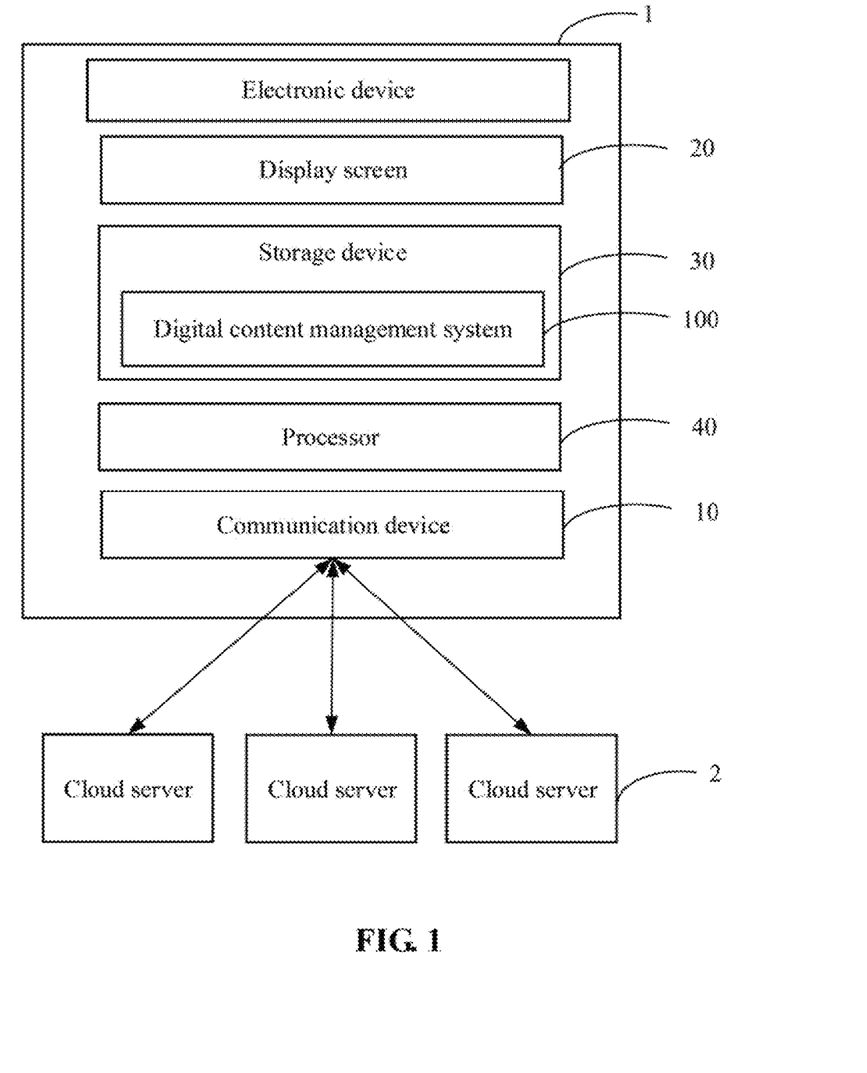
FIG. 1 is a block diagram of an embodiment of an electronic device including a digital content management system.

FIG. 1 illustrates an embodiment of an electronic device including a digital content management system 100. Depending on the embodiment, electronic device 1 can be a mobile phone, a tablet computer, or any other device such as a multimedia player.

The electronic device 1 can include a communication device 10. The electronic device 1 can communicate with a plurality of cloud servers 2 through the communication device 10, and can simultaneously obtain digital content from each of the plurality of cloud servers 2. Such that the electronic device 1 can provide to a user the digital content simultaneously obtained from each of the plurality of cloud servers 2. In at least one embodiment, the communication device 10 can be a WIFI module, or other kinds of wireless communication device such as BLUETOOTH module.

In at least one embodiment, each cloud server 2 refers to a provider of the digital content. For example, the cloud server 2 may be a server of the YouTube, QQ music, and the like for providing music to the user to listen on line and providing music download services. For another example, the cloud server 2 may be a server of the Tencent video or the Sohu video for providing video playback and video download services. For other examples, the cloud server 2 may be a server of a social networking site such as WEIBO, FACEBOOK, and the like for providing network social services (such as forum posts).

The electronic device 1 further can include a display screen 20, a storage device 30, and at least one processor 40. In at least one embodiment, the display screen 20 can be a touch display screen. In other embodiments, the display screen 20 does not have a touch function.

In at least one embodiment, the storage device 30 can be used to store program codes of computer programs and various data, such as the digital content management system 100 installed in the electronic device 1. The storage device 30 can automatically access the computer programs or data. The storage device 30 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the electronic device 1 that can be used to carry or store data.

In at least one embodiment, the at least one processor 40 may be composed of an integrated circuit, for example, may be composed of a single packaged integrated circuit, or may be composed of multiple integrated circuits having same function or different functions. The at least one processor 40 can include one or more central processing units (CPU), a microprocessor, a digital processing chip, a graphics processor, and various control chips. The at least one processor 40 is a control unit of the electronic device 1, which connects various components of the electronic device 1 using various interfaces and lines. By running or executing a computer program or modules stored in the storage device 30, and by invoking data stored in the storage device 30, the at least one processor 40 can perform functions of the electronic device 1 and process data of the electronic device 1. For example, the at least one processor 40 can execute the digital content management system 100 stored in the storage device 30 so as to manage digital data.

Figure 2:
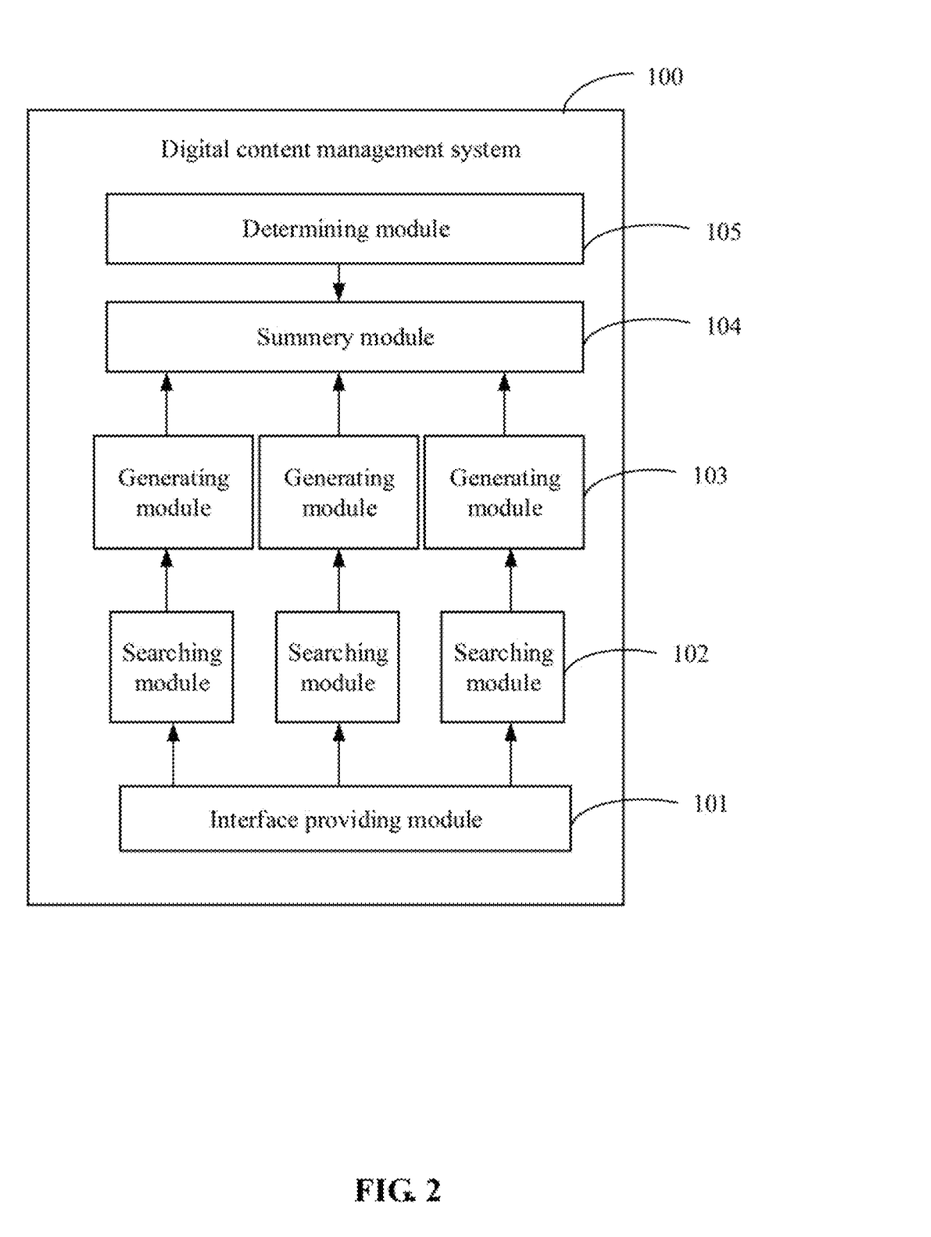
FIG. 2 is a block diagram of an embodiment of modules of the digital content management system included in the electronic device of FIG. 1.

In at least one embodiment, the digital content management system 100 can include a plurality of modules. As shown in FIG. 2, the plurality of modules can include, but is not limited to, an interface providing module 101, a plurality of searching modules 102, a plurality of generating modules 103, a summary module 104, and a determining module 105.

In at least one embodiment, a total number of the plurality of searching modules 102 equals to a total number of the plurality of generating modules 103, and equals to a total number of the plurality of cloud servers 2. In at least one embodiment, each of the plurality of searching modules 102 corresponds to each of the plurality of generating modules 103, and corresponds to each of the plurality of cloud servers 2. In at least one embodiment, the digital content management system 100 can preset a relationship between the plurality of searching modules 102, the plurality of generating modules 103, and the plurality of cloud servers 2.

For example, it is assumed that there are three cloud servers 2, three searching modules 102, and three generating modules 103. It is assumed that the three cloud servers 2 includes a first cloud server, a second cloud server, and a third cloud server. It is assumed that the three searching modules 102 includes a first searching module, a second searching module, and a third searching module. It is assumed that the three generating modules 103 includes a first generating module, a second generating module, and a third generating module. Then the first searching module corresponds to the first cloud server and corresponds to the first generating module, the second searching module corresponds to the second cloud server and corresponds to the second generating module, the third searching module corresponds to the third cloud server and corresponds to the third generating module.

Figure 3:
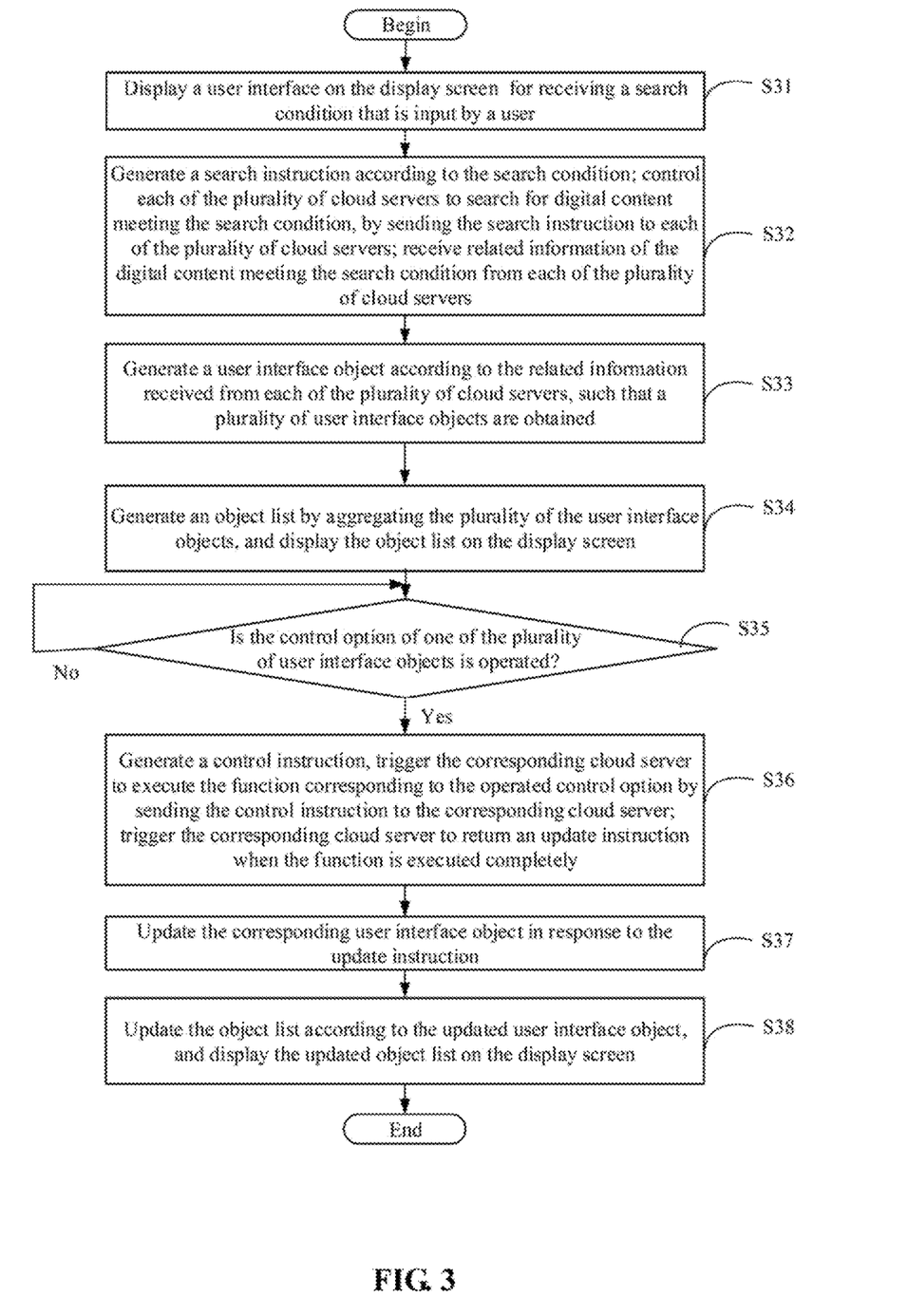
FIG. 3 is a flowchart of an embodiment of a method for managing digital content.

The modules 101-105 can include computerized instructions in a form of one or more computer-readable programs that can be stored in a non-transitory computer-readable medium (e.g., the storage device 30 of the electronic device 1), and executed by the at least one processor 40 of the electronic device 1 to manage digital content as described in FIG. 3.

In at least one embodiment, the digital content management system 100 can be integrated into the at least one processor 40. In other embodiments, the digital content management system 100 may also be independent of the at least one processor 40.

FIG. 3 illustrates a flowchart of a method of managing digital content. In an example embodiment, the method is performed by execution of computer-readable software program codes or instructions by the at least one processor 40 of the electronic device 1.

Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S31.

At block S31, the interface providing module 101 can display a user interface on the display screen 20. The user interface can be used to receive a search condition that is input by a user. In other words, the interface providing module 101 can receive the search condition through the user interface.

In at least one embodiment, the searching condition may include keywords such as a name, a published year, and/or any other information of the digital content which the user desire to obtain.

At block S32, each of the searching modules 102 can generate a search instruction according to the search condition. Each of the searching modules 102 can further control the corresponding cloud server 2 to search for digital content that meets the search condition, by sending the search instruction to the corresponding cloud server 2 through the communication device 10. When the corresponding cloud server 2 includes the digital content that meets the search condition, the corresponding cloud server 2 can send related information of the digital content that meets the search condition to the electronic device 1, such that the corresponding searching modules 102 can receive the related information of the digital content that meets the search condition from the corresponding cloud server 2.

In at least one embodiment, the related information can include, but is not limited to, function information and auxiliary information of the digital content meeting the search condition. such as downloading a resolution of digital content appropriate for the display screen 20, or selecting one version of a digital content among many based on price or permissions.

Details of the function information and auxiliary information of the digital content meeting the search condition will follow.

At block S33, each of the plurality of generating modules 103 can generate a user interface object 21 according to the received related information, such that a plurality of user interface objects 21 can be obtained.

In at least one embodiment, each user interface object 21 includes one or more control options 210. The generating module 103 can generate the one or more control options 210 based on the received function information In at least one embodiment, each control option 210 corresponds to one function provided by the cloud server 2 for the digital content meeting the searching condition. When the control option 210 is operated (e.g., touched/clicked) by the user, the function provided by the cloud server 2 can be executed.

In a first embodiments, when the digital content is the music, the functions provided by the cloud server 2 for the digital content can include, but is not limited to, a first function of listening the music on line for free, a second function of downloading the music for free, a third function of making positive comments regarding the music, a fourth function of making negative comments regarding the music, and/or a combination thereof. Accordingly, the generating module 103 can generate the control option 210 for each of the functions.

For example, the generating module 103 can generate a first control option for the first function, a second control option for the second function, a third control option for the third function, a fourth control option for the fourth function. In at least one embodiment, when the cloud server 2 requires payment for the music before downloading the music, i.e., the music is not downloaded for free, the generating module 103 can generate a fifth control option for the music. In at least one embodiment, different control options have different shapes.

Figure 4:
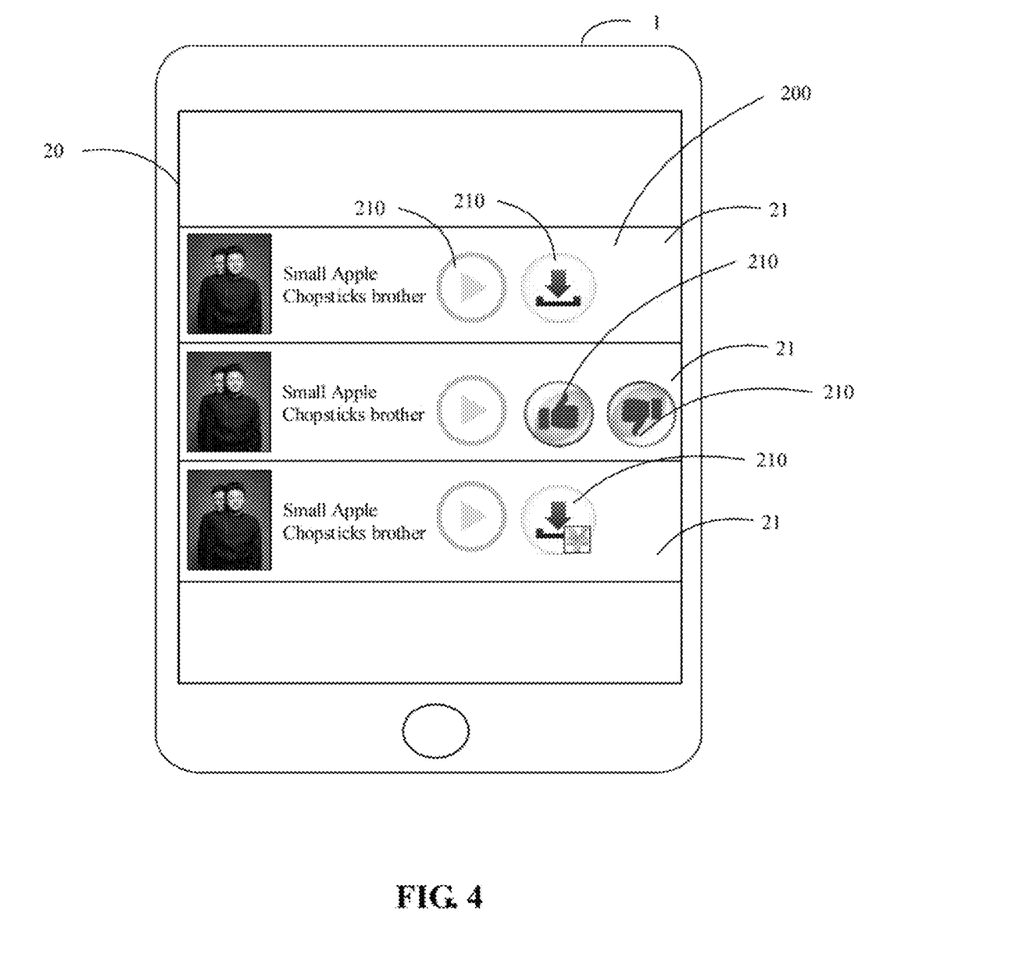
FIG. 4 illustrates an embodiment of the generating of an object list including three user interface objects.

It should be noted that the functions provided by different cloud servers 2 for the same music may be different. For example, as shown in FIG. 4, the functions of the same music "Small Apple" provided by three different cloud servers 2 are different. As shown in FIG. 4, the music "Small Apple" shown on the top is provided by a first cloud server 2 and can be free to listen and download. The music "Small Apple" shown in the middle is provided by a second cloud server 2, and can be free to listen to, can be made positive comments, and can be made negative comments to the music. The music "Small Apple" shown in the bottom is provided by a third cloud server 2, and can be free to listen to, but needs to be paid for before downloading the music.

The generating module 103 can display the received auxiliary information on the corresponding user interface object 21. In at least one embodiment, the received auxiliary information can include, but is not limited to, a name, a singer, a lyricist, a composer, and a length of time of the music, and/or a combination thereof. The received auxiliary information may further include a record of playback history, a record of recommendation, a record of the music set to be a favorite, and the like. The auxiliary information may further include a size, a creation date of the music, and a latest date of updating the music. In at least one embodiment, the auxiliary information provided by different cloud servers 2 for the same music can be different. In a second embodiments, when the digital content is the video, the functions provided by the cloud server 2 for the digital content can include, but are not limited to, a function of watching the video on line for free, a function of downloading the video for free, a function of making positive comments to the video, a function of making negative comments to the video, and/or a combination thereof. Accordingly, the generating module 103 can generate the control option 210 for each of the functions.

The generating module 103 can display the auxiliary information of the video on the corresponding user interface object 21. In at least one embodiment, the auxiliary information of the video can include, but is not limited to, a name, an actor, and a length of time of the video, and/or a combination thereof. The auxiliary information of the video may further include a record of playback history, a record of recommendation, a record of the video set to be a favorite, and the like. The auxiliary information may further include a size, a creation date of the video, and a latest date of updating the video. In at least one embodiment, the auxiliary information provided by different cloud servers 2 for the same video can be different.

In a third embodiments, when the digital content is the forum post, the functions provided by the cloud server 2 for the digital content can include, but are not limited to, a function of replying to the forum post, a function of forwarding the forum post, a function of making positive comments to the forum post, and/or a combination thereof. Accordingly, the generating module 103 can generate the control option 210 for each of the functions.

The generating module 103 can display the auxiliary information of the forum post on the corresponding user interface object 21. In at least one embodiment, the auxiliary information of the forum post can include, but is not limited to, a nickname of a creator of the forum post, content such as pictures and text of the forum post, a total number of replies to the forum post, a total number of times that the forum post is forwarded, and a total number of positive comments made to the forum post. The auxiliary information may further include a size, a creation date of the forum post, and a latest date of updating the forum post. In at least one embodiment, the auxiliary information provided by different cloud servers 2 for the same forum post can be different.

In at least one embodiment, when the digital content can be downloaded for free, the cloud server 2 can send the digital content together with the related information of the digital content to the electronic device 1 at block S32. For example, when the digital content is music, and the music can be downloaded for free, the cloud server 2 can send the music together with the related information of the music to the electronic device 1 at block S32.

At block S34, the summary module 104 can generate an object list 200 by aggregating all of the user interface objects 21, and can display the object list 200 on the display screen 20.

In at least one embodiment, the summary module 104 can generate the object list 200 by sorting all of the user interface objects 21 according to a preset rule.

In at least one embodiment, the preset rule can be sorting all of the user interface objects 21 according to a size, a creation date of the digital content meeting the searching condition, a latest date of updating the digital content meeting the searching condition, and whether or not to payment must be paid before downloading the digital content meeting the searching condition, and/or a combination thereof.

In other embodiments, the preset rule can be sorting all of the user interface objects 21 according to the auxiliary information of the digital content meeting the searching condition. For example, when the digital content is the music, the preset rule can be sorting all of the user interface objects 21 according to the singer of the music.

At block S35, the determining module 105 can determine whether the control option 210 of one of the user interface objects 21 is operated. When the control option 210 of one of the user interface objects 21 is operated, the process goes to block S36. When no control option 210 of the user interface objects 21 is operated, block S35 is repeated.

At block S36, the summary module 104 can generate a control instruction according to the operated control option 210, and can send the control instruction to the corresponding cloud server 2 via the communication device 10, thereby the corresponding cloud server 2 is triggered to execute the function corresponding to the control option 210, and the corresponding cloud server 2 is triggered to return an update instruction to the communication device 10 when the corresponding cloud server 2 executes the function completely.

At block S37, the generating module 103 can update the corresponding user interface object 21 in response to the update instruction.

In at least one embodiment, the generating module 103 can update the corresponding user interface object 21 by updating an appearance of the operated control option 210, such that the user knows that the function corresponding to the operated control option 210 is executed. In at least one embodiment, the generating module 103 can update the appearance of the operated control option 210 by changing the color of the operated control option 210.

For example, it is assumed that the user operates the control option 210 corresponding to the function of making positive comments to the music "Small Apple", i.e., the user makes a positive comment to the music "Small Apple" shown in the middle in FIG. 4. The summary module 104 can generate a control instruction according to the operated control option 210, and can send the control instruction to the corresponding cloud server 2 via the communication device 10, thereby the corresponding cloud server 2 is triggered to record the positive comments of the music, and the corresponding cloud server 2 is triggered to return an update instruction to the communication device 10 after recording a positive comment regarding the music. Then the generating module 103 updates the appearance of the operated control option 210.

For another example, if the user pays for the music "Small Apple" shown in the bottom by operating the control option 210, the summary module 104 can generate a control instruction according to the operated control option 210, and can send the control instruction to the corresponding cloud server 2 via the communication device 10, thereby the corresponding cloud server 2 is triggered to download the music to the electronic device 1, and then the generating module 103 changes the appearance of the operated control option 210 to be an appearance of a control option 210 corresponding to free download of the music.

In at least one embodiment, before the user pays for the music, the user needs to register to a third-party payment platform (not shown) using the electronic device 1. The transaction money is collected by the third-party payment platform, and then the third party payment platform transfer the money to the corresponding cloud server 2. Of course, in other embodiments, the transaction money can also be directly charged by the corresponding cloud server 2.

At block S38, the summary module 104 can update the object list 200 according to the updated user interface object 21, and can display the updated object list 200 on the display screen 20.

From the above processes, we can see that the digital content management system 100 can simultaneously display all the digital content provided by the plurality of cloud servers 2 on the display screen 20 for the user to select one if he wishes, thereby the user's time to find a desired digital content is saved.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A digital content management method applied to an electronic device, the electronic device communicable with a plurality of cloud servers to receive auxiliary content, the method comprising:

displaying a user interface on a display screen of the electronic device, and displaying the received auxiliary content in the user interface on the display screen of the electronic device;

receiving a search condition through the user interface;

generating a search instruction according to the search condition;

controlling each of the plurality of cloud servers to search for digital content meeting the search condition, by sending the search instruction to each of the plurality of cloud servers;

receiving related information of the digital content meeting the search condition from each of the plurality of cloud servers, comprising: downloading a resolution of the digital content appropriate for the display screen;

generating a user interface object according to the related information received from each of the plurality of cloud servers, such that a plurality of user interface objects are obtained, wherein each of the plurality of user interface objects comprises one or more control options, and each of the one or more control options corresponds to one function provided by the corresponding cloud server for the digital content meeting the searching condition, wherein each of the one or more control options has a different shape; and generating an object list by aggregating the plurality of the user interface objects, and displaying the object list on the display screen;

generating a control instruction when the control option of one of the plurality of user interface objects is operated;

triggering the corresponding cloud server to execute the function corresponding to the operated control option by sending the control instruction to the corresponding cloud server;

triggering the corresponding cloud server to return an update instruction when the function is executed completely;

updating the corresponding user interface object in response to the update instruction by updating an appearance of the operated control option; and updating the object list according to the updated user interface object, and displaying the updated object list on the display screen.

2. The method according to claim 1, wherein when the digital content is free, the cloud server sends the digital content and the related information of the digital content to the electronic device.

3. The method according to claim 1, wherein a method of generating of the object list comprises:

generating the object list by sorting all of the plurality of user interface objects according to a preset rule; wherein the preset rule is defined to be sorting all of the plurality of user interface objects according to a latest date of updating the digital content meeting the searching condition.

4. The method according to claim 1, wherein a method of generating of the object list comprises:

generating the object list by sorting all of the plurality of user interface objects according to a preset rule; wherein the preset rule is defined to be sorting all of the plurality of user interface objects according to the related information of the digital content meeting the searching condition, wherein the related information of the digital content meeting the searching condition comprises a record of playback history, a record of recommendation, and a record of the digital content set to be a favorite.

5. An electronic device, the electronic device communicable with a plurality of cloud servers to receive auxiliary content, comprising:

a storage device;

at least one processor; and the storage device storing one or more programs, which when executed by the at least one processor, cause the at least one processor to:

display a user interface on a display screen of the electronic device, and display the received auxiliary content in the user interface on the display screen of the electronic device;

receive a search condition through the user interface;

generate a search instruction according to the search condition;

control each of the plurality of cloud servers to search for digital content meeting the search condition, by sending the search instruction to each of the plurality of cloud servers;

receive related information of the digital content meeting the search condition from each of the plurality of cloud servers, comprising: downloading a resolution of the digital content appropriate for the display screen;

generate a user interface object according to the related information received from each of the plurality of cloud servers, such that a plurality of user interface objects are obtained, wherein each of the plurality of user interface objects comprises one or more control options, and each of the one or more control options corresponds to one function provided by the corresponding cloud server for the digital content meeting the searching condition, wherein each of the one or more control options has a different shape; and generate an object list by aggregating the plurality of the user interface objects, and displaying the object list on the display screen;

generate a control instruction when the control option of one of the plurality of user interface objects is operated;

trigger the corresponding cloud server to execute the function corresponding to the operated control option by sending the control instruction to the corresponding cloud server;

trigger the corresponding cloud server to return an update instruction when the function is executed completely;

update the corresponding user interface object in response to the update instruction by updating an appearance of the operated control option; and update the object list according to the updated user interface object, and displaying the updated object list on the display screen.

6. The electronic device according to claim 5, wherein when the digital content is free, the cloud server sends the digital content and the related information of the digital content to the electronic device.

7. The electronic device according to claim 5, wherein a method of generating of the object list comprises:

generating the object list by sorting all of the plurality of user interface objects according to a preset rule; wherein the preset rule is defined to be sorting all of the plurality of user interface objects according to a latest date of updating the digital content meeting the searching condition.

8. The electronic device according to claim 5, wherein a method of generating of the object list comprises:

generating the object list by sorting all of the plurality of user interface objects according to a preset rule; wherein the preset rule is defined to be sorting all of the plurality of user interface objects according to the related information of the digital content meeting the searching condition, wherein the related information of the digital content meeting the searching condition comprises a record of playback history, a record of recommendation, and a record of the digital content set to be a favorite.

9. A non-transitory storage medium having instructions stored thereon, when the instructions are executed by a processor of an electronic device, the processor is configured to perform a digital content management method, the electronic device communicable with a plurality of cloud servers to receive auxiliary content, wherein the method comprises:

displaying a user interface on a display screen of the electronic device, and displaying the received auxiliary content in the user interface on the display screen of the electronic device;

receiving a search condition through the user interface;

generating a search instruction according to the search condition;

controlling each of the plurality of cloud servers to search for digital content meeting the search condition, by sending the search instruction to each of the plurality of cloud servers;

receiving related information of the digital content meeting the search condition from each of the plurality of cloud servers, comprising: downloading a resolution of the digital content appropriate for the display screen;

generating a user interface object according to the related information received from each of the plurality of cloud servers, such that a plurality of user interface objects are obtained, wherein each of the plurality of user interface objects comprises one or more control options, and each of the one or more control options corresponds to one function provided by the corresponding cloud server for the digital content meeting the searching condition, wherein each of the one or more control options has a different shape; and generating an object list by aggregating the plurality of the user interface objects, and displaying the object list on the display screen;

generating a control instruction when the control option of one of the plurality of user interface objects is operated;

triggering the corresponding cloud server to execute the function corresponding to the operated control option by sending the control instruction to the corresponding cloud server;

triggering the corresponding cloud server to return an update instruction when the function is executed completely;

updating the corresponding user interface object in response to the update instruction by updating an appearance of the operated control option; and updating the object list according to the updated user interface object, and displaying the updated object list on the display screen.

10. The non-transitory storage medium according to claim 9, wherein when the digital content is free, the cloud server sends the digital content and the related information of the digital content to the electronic device.

11. The non-transitory storage medium according to claim 9, wherein a method of generating of the object list comprises:

generating the object list by sorting all of the plurality of user interface objects according to a preset rule; wherein the preset rule is defined to be sorting all of the plurality of user interface objects according to a latest date of updating the digital content meeting the searching condition.

12. The non-transitory storage medium according to claim 9, wherein a method of generating of the object list comprises:
   generating the object list by sorting all of the plurality of user interface objects according to a preset rule; wherein the preset rule is defined to be sorting all of the plurality of user interface objects according to the related information of the digital content meeting the searching condition, wherein the related information of the digital content meeting the searching condition comprises a record of playback history, a record of recommendation, and a record of the digital content set to be a favorite.

* * * * *